Nov. 17, 1959     S. L. HARGROVE     2,912,788
DISPOSABLE SELF FEEDER FOR RODENTS
Filed Feb. 21, 1958     2 Sheets-Sheet 1
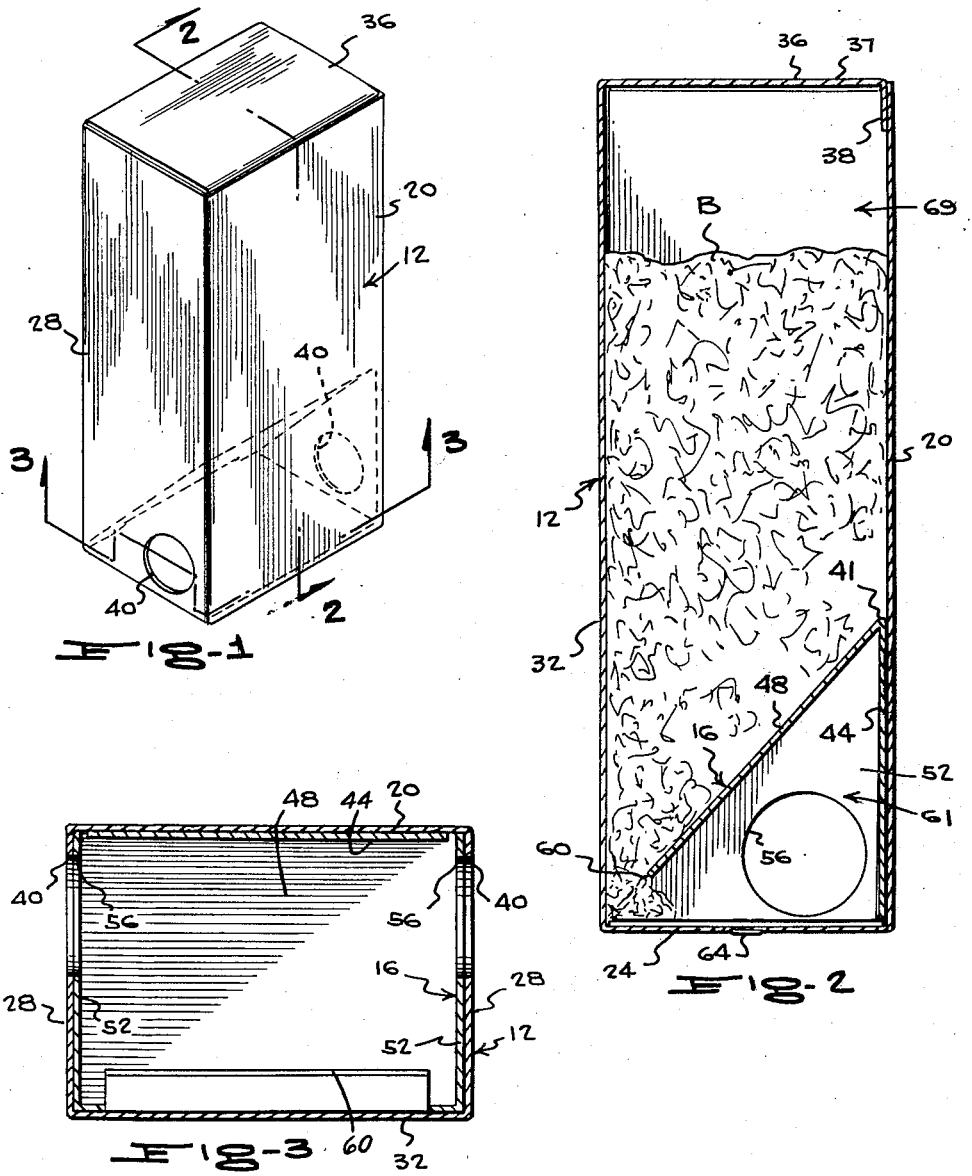
INVENTOR.
STONE L. HARGROVE
BY
*McMorrow, Berman + Davidson*
ATTORNEYS Nov. 17, 1959   S. L. HARGROVE   2,912,788
DISPOSABLE SELF FEEDER FOR RODENTS
Filed Feb. 21, 1958   2 Sheets-Sheet 2
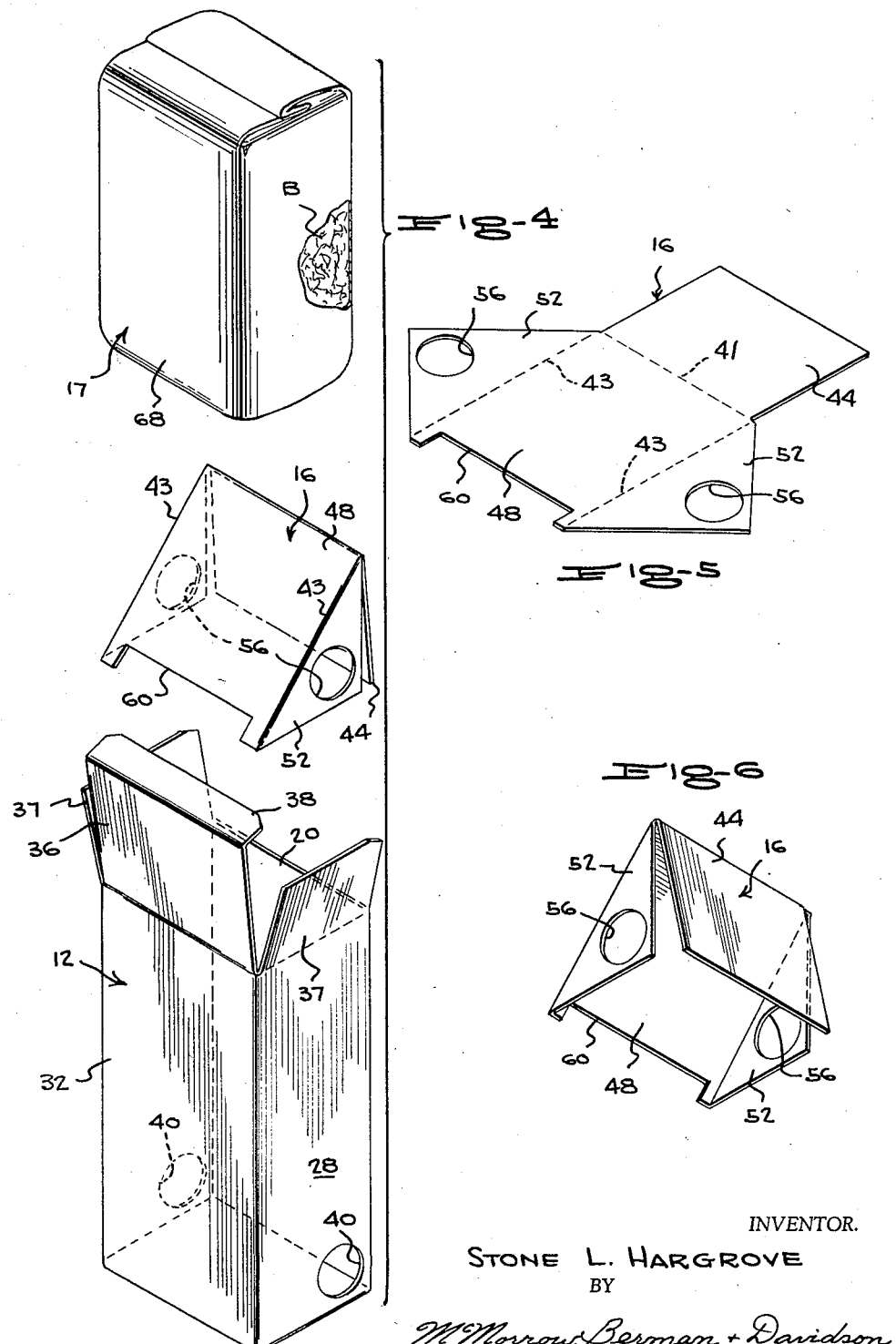
INVENTOR.
STONE L. HARGROVE
BY
McMorrow, Berman + Davidson
ATTORNEYS

United States Patent Office 2,912,788
Patented Nov. 17, 1959

2,912,788

DISPOSABLE SELF FEEDER FOR RODENTS

Stone L. Hargrove, Harlingen, Tex.

Application February 21, 1958, Serial No. 716,734

1 Claim. (Cl. 43—131)

This invention relates generally to rodent extermination devices. More particularly, the invention has reference to a self feeder for anti-coagulant rat baits.

In the feeding of anti-coagulant baits to rodents, expecially rats, it is a necessity that fresh bait be exposed to the rats for weeks at a time. This of course presents certain problems, since the continuous exposure of the bait is generally accompanied by fouling of the same by the rodents, over a period of time, to an extent such that the bait loses its effectiveness. Further, the bait at the bait station tends to be scattered by the rodents, and in addition, is exposed in a manner such that it may be accidentally consumed by domestic fowl, children, pets, etc.

The main object of the present invention is to provide a disposable self feeder for rats and other rodents, which will eliminate the difficulties noted above, and which will have certain other advantages that will be described in full detail hereinafter.

Another object is to provide a low cost, disposable unit which will have triple utility, as a shipping container for the bait, a shelf display package, and, of main importance, as an end use container for baits, especially anti-coagulant baits.

Another object is to provide a self feeder of the character described in which the bait will be caused to feed automatically through a feed gate into a sheltered feeding chamber to which access is permitted the rodents. By reason of this arrangement, it is proposed to provide a feeding station that will be particularly attractive to the rodents, in that it will have a sheltered chamber which, it has been found, is a prime necessity in the feeding of baits of this type to rodents.

Another object is to provide a self feeding device for rodent baits, which will be so designed as to prevent its being fouled by the rodents, will keep the bait fresh, will be designed to always expose a portion of the bait to the rodents, will prevent wastage and scattering of the bait, and will be capable of manufacture at a very low cost, while being a rugged bait holding means having a marked efficiency in attracting rodents and feeding bait to the same.

Another object is to provide a device of the character stated which will be novelly formed to include a simply designed outer container in which the bait can be packed, and which will further include a container insert the form of which is such as to first, provide the sheltered feeding chamber for the rodents; second provide the ready and attractive ingress and egress for the rodents; third, will protect the bait from being scattered, wasted, or alternatively accidentally consummed by chickens, pets, etc.; and fourth, will at all times insure gravitation of a fresh quantity of bait to one side of the mentioned feeding chamber.

Other objects will appear from the following description, the claims appended thereto, and from the annexed drawings, in which like reference characters designate like parts throughout the several views, and wherein:

Figure 1 is a perspective view of a self feeder for rodent baits, according to the present invention;

Figure 2 is a longitudinal sectional view therethrough on an enlarged scale, substantially on line 2—2 of Figure 1;

Figure 3 is a transverse sectional view, substantially on line 3—3 of Figure 1, on the same scale as Figure 2;

Fig. 4 is an exploded perspective view of the device, a portion being broken away, on the same scale as Fig. 1;

Figure 5 is a perspective view of the blank from which the container insert is formed; and, Figure 6 is a perspective view of the container insert as seen from below.

Referring to the drawings in detail, the disposable bait feeding device constituting the present invention comprises three main components, in the illustrated example. These are an outer container 12, a container insert 16, and an inner container 17 (Figure 4). The inner container 17, as will presently appear, may be omitted in a commercial embodiment of the invention, although at present it is found to simplify merchandising of the device. In every instance, however, the container 12 and insert 16 would be used, in the relationship shown to particular advantage in Figure 2.

Considering first the construction of the container 12, this would be provided with external printing, color markings, etc., in a commercial embodiment, since the device when displayed upon the shelf, and when otherwise offered for sale to the ultimate consumer, appears as in Figure 1, with the container 17 (if one is used) being wholly concealed within the outer container 12.

In any event, the outer container 12, as well as the insert 16, would be formed from inexpensive, stout, fibrous stock, such as corrugated paperboard.

The outer container 12 includes a vertical, rectangular front wall 20 elongated in a vertical direction, a flat, rectangular bottom wall 24, vertical side walls 28 coextensive in height with the front wall 20, and a back wall 32 formed integrally at its upper end with a lid 36. Inwardly turned flaps 37 are formed upon the upper ends of the side walls 28 (Figure 4), these being folded inwardly under the lid 36 (see Figure 2). Lid 36 has a depending flap 38 along its free edge, which is inserted between front wall 20 and flaps 37 in the closed position of the lid.

The outer container obviously could be formed from a single piece or blank of fibrous material, folded, and glued or otherwise provided with connections, in a manner well known in the art of manufacture of paper boxes.

Referring to Figure 1, in close proximity to the lower extremities of the side walls 28, circular openings 40 are formed in the side walls adjacent front wall 20. These are aligned transversely of the outer container as shown in Figure 1, and are of a size such as to permit the ready passage of rodents therethrough. The openings 40, thus, define "rat holes," found attractive to rodents when leading, as in the present invention, to a sheltered feeding chamber.

Referring now to the construction of the insert 16, this is formed from a blank shaped as shown in Figure 4. The blank is of corrugated paperboard or similar fibrous stock of inexpensive but rugged characteristics. The insert blank shown in Figure 5 is folded, somewhat in tent fashion as in Figure 6, along a transverse fold line 41, and along fold lines 43 provided at the sides of the insert.

Folding of the insert along the line 41 defines a front wall 44 vertically disposed in contact with wall 20 (see Figure 2). Further, there is provided a top wall 48 on the insert declining in a direction rearwardly from the top edge of the front wall 44, and terminating at its lower, back edge substantially at the juncture between bottom wall 24 and back wall 32 of outer container 12.

Folding of the insert along the lines 43 produces side walls 52. These are of right-triangular configuration, with their bottom edges supported upon bottom wall 24. Formed in walls 52 are openings 56 which register with openings 40 (see Figure 3).

In the back edge of the wall 48 there is formed, over substantially the full width of said wall, a recess 60. The bait B provided within the container gravitates through recess 60 as shown in Figure 2, thus passing into a feeding chamber 61 (defined below the top wall 48), into which the rodents pass through the registered openings 40, 56.

The insert is merely folded in the manner shown in Figures 5 and 6, and is inserted in the outer container. The outer container may be either fully or partially assembled at this time, and may be closed at its bottom by staples 64 or equivalent means. These, of course, are purely manufacturing details not bearing on the patentability of the invention, except in respect to showing the ease and very low cost of assembly of the component parts of the device.

The bait B, preferably a bait of the anti-coagulant type, is readily sold with the outer container 12 and insert 16, as part of a complete package, and can be provided, at this time within a paper sack 68 constituting the inner container 17. This sack may be positioned directly within the upper compartment 69 of the outer container defined above the insert, and after the package is purchased by the consumer, he may simply empty the sack 68 into the upper compartment 69, so that the upper compartment receives all the bait B in the manner shown in Figure 2. The bait immediately starts feeding downwardly through the recess 60, into the feeding chamber 61.

The device is now merely positioned at any selected location, and the rodents will move into the chamber 61 through the registered circular, side openings, to obtain access to the bait B feeding downwardly through opening or recess 60. As will be noted, the chamber is so designed as to deny access to chickens, household pets, etc. Further, the chamber provides a sheltered feeding station for the rodents, this being a necessity in the feeding of anti-coagulant baits to rodents.

Still further, the construction will maintain fresh bait within the back of the feeding chamber, at all times, since the bait, as is readily apparent from Figure 2, will feed downwardly through opening 60, responsive to consumption of bait already within the feeding chamber. Scattering of the bait is also prevented, since the bait feeds into a back portion of a triangularly shaped feeding chamber, which back portion is of acute-angular shape as shown in Figure 2, so as to prevent the rodents from walking through the bait and otherwise fouling the same.

The device is of course fully disposable, and thus meets another important requirement of rodent bait stations, since in a single season or less, any bait station frequented by rodents tends to become so foul as to lose its effectiveness.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A combination sales carton and self feeder for rodent baits, comprising a rectangular, upstanding container having a horizontal bottom wall and vertical front, back, and side walls extending upwardly from said bottom wall, said container having adjacent said bottom wall a pair of transversely aligned openings located in the side walls in close proximity to the front wall and providing an ingress and egress for rodents; and a container insert formed wholly separately from said container and removably seated in the lower end of the container, said insert comprising right-triangular, opposite side walls in face to face contact with the respective container side walls, said side walls of the insert having bottom edges supported on said bottom wall, the side walls of the insert having transversely aligned openings registering with the first-named openings, and a top wall extending in an inclined path the full distance between said front and back walls to divide the container interior into an upper compartment in which the bait may be initially confined, and a lower feeding chamber with which the registered first and second-named openings communicate, the top wall extending at its lower end into convergence with the bottom wall at the intersection of the bottom and back walls of the container, said top wall having an opening at said lower end thereof communicating between said compartment and chamber for gravitational feeding of the bait through the last-named opening into said chamber.

References Cited in the file of this patent

UNITED STATES PATENTS

| 610,775 | Thompson | Sept. 13, 1898 |
| 1,987,771 | Bueschel | Jan. 15, 1935 |
| 1,988,064 | Wiemann | Jan. 15, 1935 |
| 2,683,326 | Gardner et al. | July 13, 1954 |
| 2,716,305 | Schutte | Aug. 30, 1955 |
| 2,763,093 | Scott et al. | Sept. 18, 1956 |

FOREIGN PATENTS

| 733,627 | Great Britain | July 13, 1955 |